US012762777B2

(12) United States Patent
Chen et al.

(10) Patent No.: US 12,762,777 B2
(45) Date of Patent: Oct. 13, 2026

(54) MUSIC-DRIVEN DANCE VIDEO GENERATION

(71) Applicant: Lemon Inc., Grand Cayman (KY)

(72) Inventors: Zeyuan Chen, Los Angeles, CA (US); Hongyi Xu, Los Angeles, CA (US); Guoxian Song, Los Angeles, CA (US); Chenxu Zhang, Los Angeles, CA (US); You Xie, Los Angeles, CA (US); Xin Chen, Los Angeles, CA (US); Linjie Luo, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 116 days.

(21) Appl. No.: 18/981,290

(22) Filed: Dec. 13, 2024

(65) Prior Publication Data

US 2026/0170740 A1 Jun. 18, 2026

(51) Int. Cl.
*G06T 13/40* (2011.01)
*G06T 13/20* (2011.01)
*G06T 13/80* (2011.01)

(52) U.S. Cl.
CPC ............ *G06T 13/40* (2013.01); *G06T 13/205* (2013.01); *G06T 13/80* (2013.01)

(58) Field of Classification Search
CPC ........ G06T 13/40; G06T 13/205; G06T 13/80
See application file for complete search history.

(56) References Cited

U.S. PATENT DOCUMENTS

2020/0342646 A1* 10/2020 Wang .................. G06N 3/0455
2022/0335625 A1* 10/2022 Shimizu .................. A61B 5/02

FOREIGN PATENT DOCUMENTS

CN 117853521 A * 4/2024 ............ G06V 40/20
WO WO-2007096691 A2 * 8/2007 .......... G06T 13/205

OTHER PUBLICATIONS

Zeyuan Chen et al., X-Dancer: Expressive Music to Human Dance Video Generation, 2025, 2025 IEEE/CVF International Conference on Computer Vision (ICCV), Honolulu, HI, USA, 2025, pp. 10602-10611. (Year: 2025).*

Yufei Gao et al., Music to Dance: Motion Generation Based on Multi-Feature Fusion Strategy, 2022, 2022 IEEE International Symposium on Circuits and Systems (ISCAS), Austin, TX, USA, 2022, pp. 2735-2739. (Year: 2022).*

(Continued)

*Primary Examiner* — Jeffery A Brier
(74) *Attorney, Agent, or Firm* — Alleman Hall LLP

(57) ABSTRACT

Implementations for music-driven dance video generation are provided. One example includes a computing system comprising: processing circuitry and memory storing instructions that, during execution, causes the processing circuitry to: receive a reference image and a music sequence; generate music embeddings using the music sequence; generate a sequence of pose tokens using one or more two-dimensional (2D) pose encoders and the reference image; autoregressively generate one or more successive sequences of pose tokens using a transformer model, the sequence of pose tokens, and the music embeddings; generate one or more feature maps using a motion guidance decoder and the one or more successive sequence of pose tokens; and generate one or more successive image frames using a diffusion model conditioned on the reference image and the one or more feature maps.

20 Claims, 6 Drawing Sheets

(56) References Cited

OTHER PUBLICATIONS

Tseng, J et al., "EDGE: Editable Dance Generation From Music," arXiv, Nov. 27, 2022, 16 pages.
Li, S et al., "Bailando: 3D Dance Generation by Actor-Critic GPT with Choreographic Memory," arXiv, Mar. 25, 2022, 10 pages.
Xu, M et al., "Hallo: Hierarchical Audio-Driven Visual Synthesis for Portrait Image Animation," arXiv, Jun. 13, 2024, 20 pages.

* cited by examiner

| Metrics | AIST++ Dataset / In-House Dataset | | |
|---|---|---|---|
| | FVD ↓ | DIV ↑ | BAS ↑ |
| Ground Truth | 509.58/129.75 | 34.10/29.67 | 0.24/0.22 |
| Hallo | 548.81/249.12 | **28.66/28.98** | 0.16/0.20 |
| Bailando | 621.22/534.02 | 22.34/24.05 | 0.19/0.19 |
| EDGE | 639.46/303.36 | 24.87/27.29 | **0.26/0.24** |
| MMD | **531.52/238.22** | 25.61/28.08 | 0.23/0.21 |

FIG. 4

| | FVD ↓ | DIV ↑ | BAS ↑ |
|---|---|---|---|
| w/o global music context | 265.73 | 27.04 | 0.2142 |
| w/o global motion context | 247.54 | 26.42 | 0.2154 |
| sub-dataset + GPT-medium | 402.63 | 24.40 | 0.2112 |
| sub-dataset + GPT-small | 332.93 | 24.58 | 0.2046 |
| MMD | **238.22** | **28.08** | **0.2182** |

FIG. 5

| Metrics | In-House Dataset | | |
|---|---|---|---|
| | FVD ↓ | FID-VID ↓ | ID-SIM ↑ |
| Hallo | 609.08 | 76.99 | 0.4870 |
| Bailando + PG | 583.26 | 100.02 | 0.3392 |
| EDGE + PG | 613.81 | 93.73 | 0.3034 |
| In-House Motion + PG | 735.05 | 72.71 | 0.4894 |
| MMD | **507.05** | **61.94** | **0.5317** |

FIG. 6

MUSIC-DRIVEN DANCE VIDEO GENERATION

BACKGROUND

Many different generative machine learning (ML) models have been contemplated for performing various tasks, implementing machine learning techniques and architectures. One class of models includes diffusion probabilistic models. Diffusion models can be implemented for various tasks, including image generation and video generation. Generally, a diffusion model is trained to learn a diffusion process based on a training dataset such that it can generate new content similar to said dataset. The diffusion process typically involves sequentially denoising images blurred with Gaussian noise. The denoising process is performed by a backbone model, which is typically implemented using U-nets or transformers.

SUMMARY

Implementations for music-driven dance video generation are provided. One example includes a computing system comprising: processing circuitry and memory storing instructions that, during execution, causes the processing circuitry to: receive a reference image and a music sequence; generate music embeddings using the music sequence; generate a sequence of pose tokens using one or more two-dimensional (2D) pose encoders and the reference image; autoregressively generate one or more successive sequences of pose tokens using a transformer model, the sequence of pose tokens, and the music embeddings; generate one or more feature maps using a motion guidance decoder and the one or more successive sequence of pose tokens; and generate one or more successive image frames using a diffusion model conditioned on the reference image and the one or more feature maps.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 shows a table quantitatively comparing motion generation capabilities between various dancing video generation models for two different datasets.

FIG. 5 shows a table quantitatively comparing visual synthesis capabilities between various dancing video generation models.

FIG. 6 shows a table of ablation studies for a music-driven dance video generation model.

DETAILED DESCRIPTION

Figure 1:
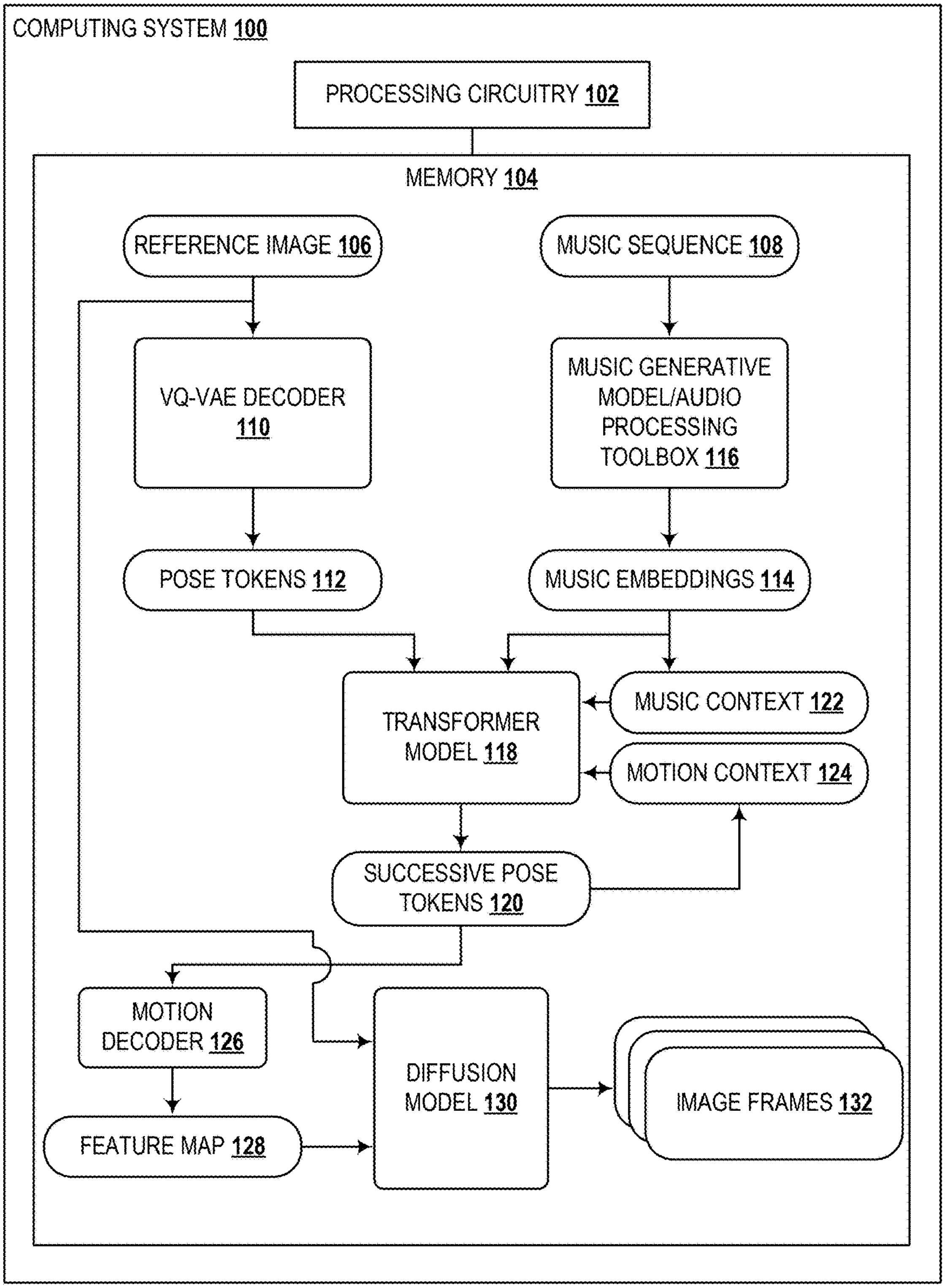
FIG. 1 shows a schematic view of an example computing system for implementing a music-driven dance video generation pipeline.

Dance is a universal form of self-expression and social communication, deeply embedded in human behavior and culture. With the rise of social media platforms, there is a large trend of users sharing self-expressive dance videos online. However, creating expressive choreography typically involves talent, effort, practice, and even professional training. From a computational aspect, generating realistic dance movements can be challenging due to the freeform, personalized nature of dance and its alignment with musical rhythm and structure.

Many advancements have been made in realistic human motion generation from various inputs, such as input speech or text. However, the task of music-to-dance generation presents unique challenges that have yet to be solved elegantly. One challenge is to ensure that the generated dance rhythmically aligns with the music. Another challenge is producing intricate motions with diverse styles and speed. Current solutions mostly implement models that are trained on three-dimensional (3D) human pose datasets. Some models utilize a vector quantized variational autoencoder (VQ-VAE) for 3D pose encoding, followed by a generative pre-training transformer model to generate body poses conditioned on music. Another solution involves utilization of a diffusion framework to predict human poses from a noisy sequence, conditioning on music and employing long-form sampling for extended dance sequences. Despite these advancements, existing approaches trained on 3D datasets often generate dance poses with limited diversity and are primarily confined to a 3D format.

In addition to challenges in generating dance poses and motions, the generation of realistic, high-quality human videos also presents several challenges. With current advancements in diffusion models, generating high-quality human videos has become feasible. Some methods contemplate creating realistic dance videos from a reference image using motion signals such as two-dimensional (2D) skeletons, dense poses, and depth maps. While these methods provide explicit control over body poses and allow flexible motion manipulation, they often struggle to preserve the original body shape and other features, leading to noticeable leakage, particularly when significant differences exist between the target and source. Several methods adopt an end-to-end pipeline for generating realistic talking human videos from audio by injecting audio features directly into the network via cross-attention layers. While these methods have advanced in realism and dynamic quality, they still struggle to capture long-range motion and audio context due to high computational demands. Moreover, these frameworks have primarily been validated on audio-driven portrait animations where they excel in capturing micro-expressions and lip movements. However, they fall short in handling the complexities of full-body kinematics and rapid motion transitions that are involved with dynamic, shape-preserving dance movements.

In view of the observations above, implementations of models for video generation of music-driven dance movements are provided. The present disclosure provides for a unified framework capable of creating a continuous, expressive, and lifelike dance video from a single static image, driven by a music track. The framework can be implemented to integrate an autoregressive transformer model capable of generating extended dance sequences attuned to input music, coupled with a diffusion model for producing high-resolution, lifelike videos. In contrast to prior methods, the framework presented herein can generate smooth, diverse full-body movements at finer scales that capture the complex, non-linear synchronization with music inputs. These generated body movements can be translated into high fidelity video outputs that maintain visual consistency with the reference image and ensure temporal smoothness.

Prior methods mainly focused on 3D music-to-dance motion generation, utilizing 3D human poses such as SMPL skeletons generated from music inputs. Such methods are constrained by limited training datasets (primarily a multi-view dataset), which lack diversity and normally only contain 3D body poses (excluding motions of the head, hands, and other body parts). Expanding these datasets with widely available 2D monocular dance videos would require 3D human pose estimation, which is often error-prone and risks degraded motion quality and consistency. In contrast, the framework presented herein can model 2D human motion, overcoming the data constraints described above by leveraging widely accessible dance videos where 2D pose estimation is both reliable and scalable.

For effective autoregressive motion generation, the framework presented herein includes a multi-part tokenization scheme for per-frame 2D whole-body poses, incorporating detected keypoint confidences to capture multi-scale human motions with motion blur and various occlusions. Thereafter, the framework includes a trained cross-modal transformer that auto-regressively predicts future N-frame pose tokens, paired with per-frame music features extracted using a music/audio processing toolbox and/or a pre-trained generative model for music. The framework enables the model to capture a broader diversity of expressive, music-aligned movements with enhanced scalability in both model complexity and data scale.

A text-to-image diffusion model with temporal layers can be utilized to animate the reference image by implicitly translating the generated confidence-aware motion tokens into spatial guidance via a trainable motion token decoder. Specifically, the model upsamples from a learnable feature map into multi-scale spatial feature guidance, integrating motion tokens through an adaptive instance normalization (AdaIN) layer during the upsampling process. By co-learning pose translation with temporal and appearance reference modules, the diffusion backbone can interpret motion tokens with temporal context and body shape reference, leading to better shape-disentangled pose control and smoother and more robust visual outputs, even under low-confidence or jittering pose sequences. This design establishes an end-to-end transformer-diffusion learning framework, merging the transformer's strengths in long-context understanding and generation with the diffusion model's high-quality visual synthesis.

Turning now to the drawings, implementations of models for video generation of music-driven dance movements are depicted and described in further detail. FIG. 1 shows a schematic view of an example computing system 100 for implementing a music-driven dance video generation pipeline. The example computing system 100 includes processing circuitry 102 and memory 104 storing instructions that, during execution, cause the processing circuitry 102 to perform the processes described herein. The example computing system 100 can be implemented with various types of computing devices, including but not limited to personal computers, servers, and mobile devices. For example, the computing system 100 can include a plurality of computing devices, and processing circuitry 102 and memory 104 may each include multiple components spread across multiple computing devices (e.g., processing circuitry 102 can include multiple processors within a single device or spread across multiple devices). The devices may be locally or remotely located. In some implementations, the computing system 100 is implemented as cloud storage servers. The example computing system 100 can also include non-depicted components for providing various functionalities, including components on individual computing devices.

The pipeline includes two major stages: a transformer-based 2D human dance motion generation process for generating a motion sequence, and a diffusion-based video synthesis process using the generated motion sequence. At the first stage, the pipeline starts with receiving a reference image 106 and a music sequence 108. A VQ-VAE decoder 110 is utilized to extract pose information from the reference image 106. In the depicted example, the VQ-VAE decoder 110 extracts pose information in the form of pose tokens 112. In some implementations, the pose tokens 112 are a sequence of pose tokens that describes the poses of individual body parts. In further implementations, the pose tokens 112 are quantized embeddings represented in codebooks that describe predetermined poses based on the quantized value.

The pipeline further includes generating music embeddings 114 from the music sequence 108. The music embeddings 114 are latent representations of the music sequence 108 that can be used to condition the generative process. The music embeddings 114 can be generated in various ways. In the depicted example, the music embeddings 114 are generated using a pre-trained generative model for music and an audio processing toolbox 116. In such cases, the music embeddings 114 can include two distinct sets of embeddings. Depending on how the music embeddings 114 are generated, they can be used to condition the generative process on different aspects. For example, music embeddings generated from an audio processing toolbox can provide latent representations describing a rhythm of the music sequence 108. Music embeddings generated from the pre-trained generative model can provide more information on the musical genre of the music sequence. In other implementations, only one set of music embeddings is generated.

The initial pose tokens 112 describing the poses in the reference image 106 can be used to predict next tokens. In the depicted example, a transformer model 118 is utilized to predict a sequence of successive pose tokens 120 using the initial sequence of pose tokens 112. The prediction can be conditioned on the music embeddings 114. In some implementations, the music embedding(s) corresponding to the current time point associated with the successive sequence of pose tokens 120 is utilized for conditioning. Additionally, the entirety of the music embeddings 114 can be used as music context 122 for the overall generation of the dancing video. This can, for example, provide consistency in musical style/genre, ensuring the generated dance is appropriate to the music sequence 108 as a whole.

In addition to music context 122, motion context 124 can also be utilized to generate the sequence of successive pose tokens 120. In some implementations, the motion context 124 includes preceding motion information, such as preceding pose tokens. The number of preceding pose tokens utilized can depend on the desired context window. In some implementations, the motion context 124 includes all preceding pose tokens. In other implementations, the motion context 124 includes a predetermined number of preceding sequences of pose tokens. Different sampling methods can be utilized, including but not limited to uniform sampling.

After successive pose tokens 120 are generated, the pipeline includes, at the second stage, utilizing a motion guidance decoder 126 to generate a feature map 128, which is a 2D representation of poses described by the successive sequence of pose tokens 120. Rather than explicit translation of the pose tokens into 2D skeleton maps, the motion decoder 126 translates the 1D pose tokens into a feature map 128 that provides 2D spatial guidance. A diffusion model 130 is implemented to generate successive image frames 132 conditioned on the feature map 128. This generates images with a human pose corresponding to the spatial guidance provided by the feature map 128. In the depicted example, the diffusion process is further conditioned on the reference image 106. This ensures that the person in the generated frames remains consistent throughout. As successive pose tokens 120 are generated base on preceding tokens and music context 122 and not on the generated successive image frames 132, generation of successive pose tokens 120 can be performed all at once before the generation of the image frames. Similarly, the image frames can be generated simultaneously or concurrently after all the pose tokens have been generated.

Figure 2:
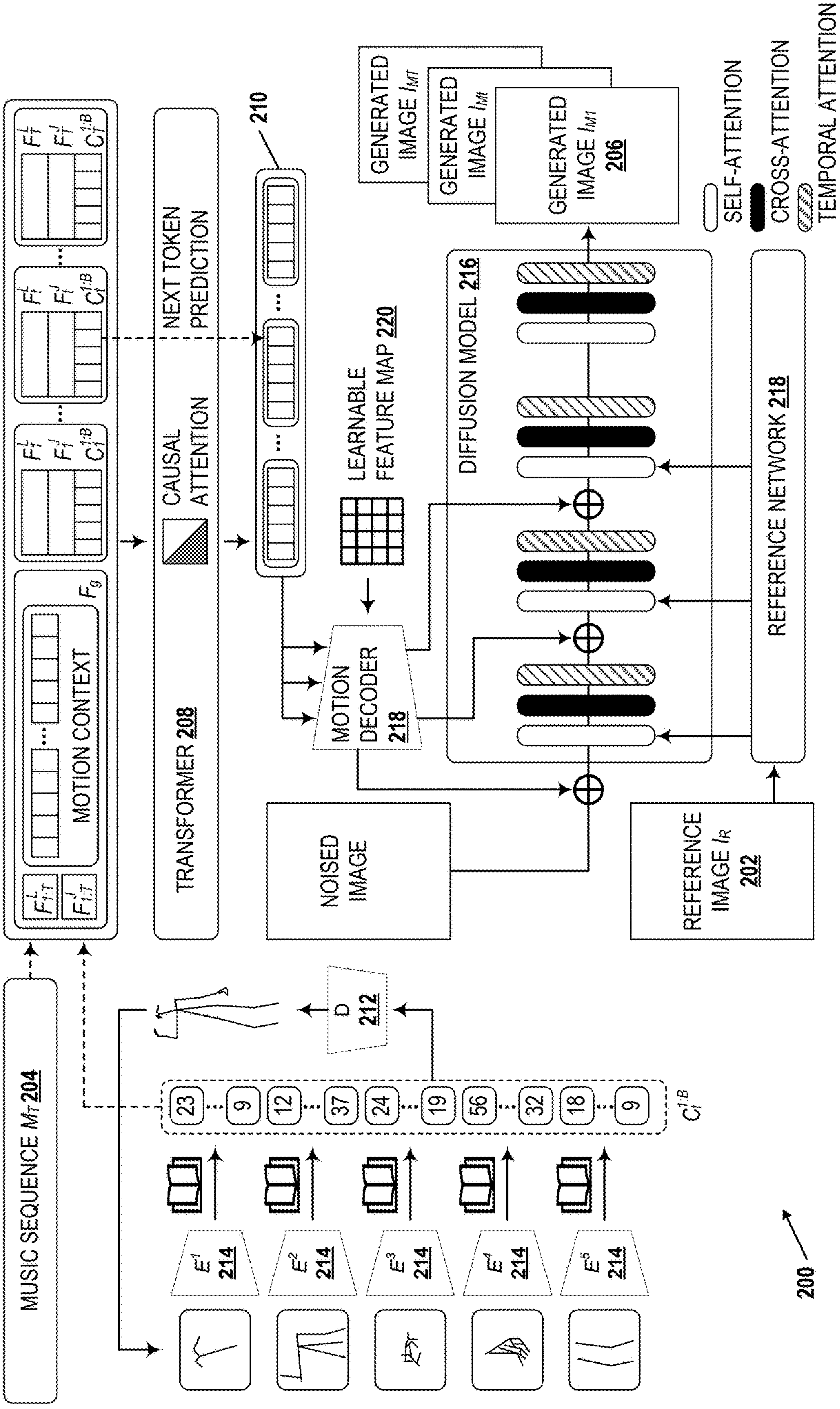
FIG. 2 shows a schematic view of a music-driven dance video generation pipeline, which can be implemented using the example computing system of FIG. 1.
Figure 3:
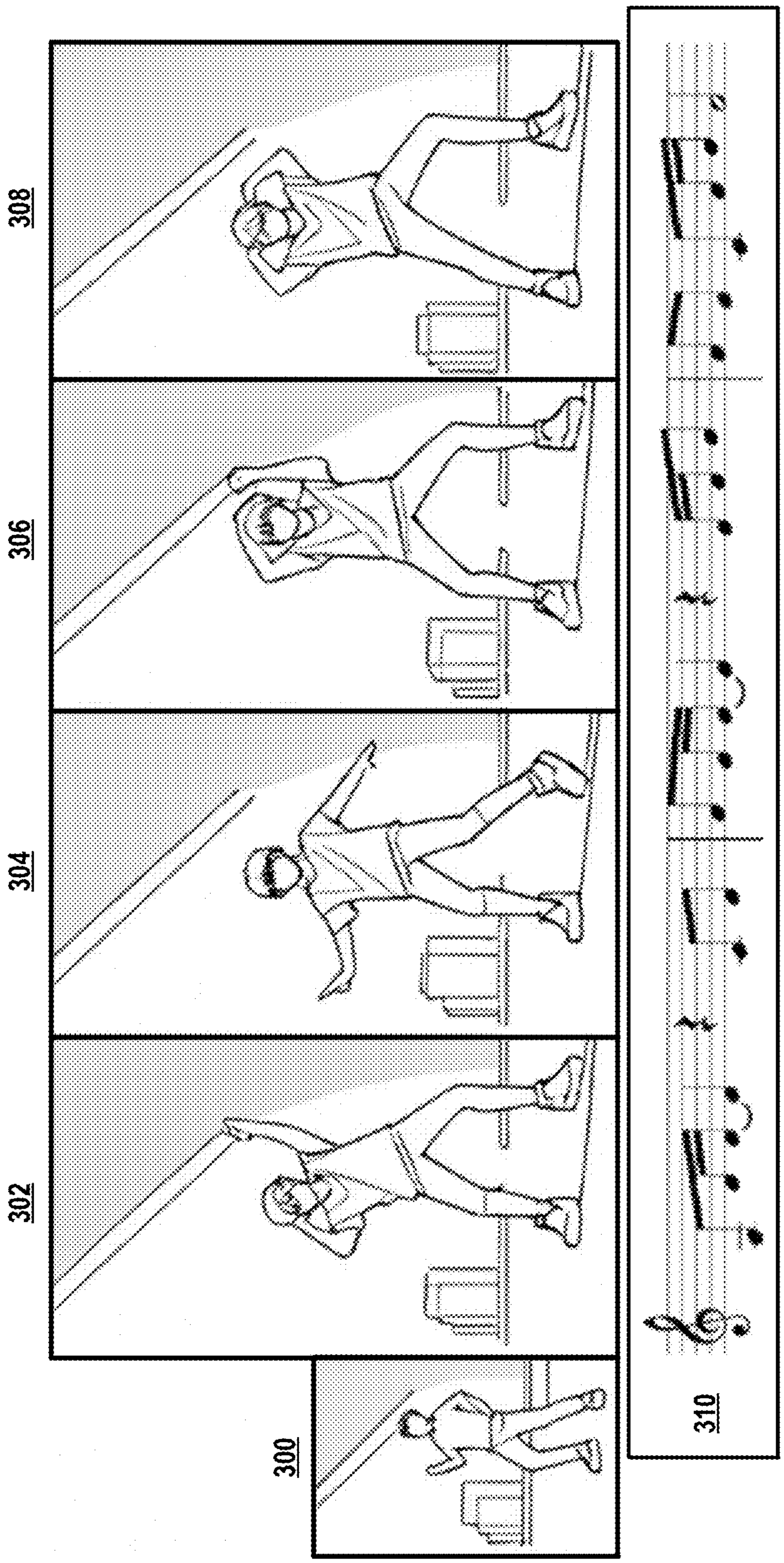
FIG. 3 shows an example reference image and corresponding sampled frames generated from a music-driven dancing video generation model, which can be generated using the example computing system of FIG. 1.

FIG. 2 shows a schematic view of a music-driven dance video generation pipeline 200. Given a single reference image $I_R$ 202 of a human subject and a conditioning music sequence 204 represented as $M_t$, the pipeline 200 generates a sequence of dance frames $I_{M_t}$ 206, where t=1, . . . , T denotes the frame index. The generated sequence $I_{M_t}$ 206 seeks to maintain the appearance and background context depicted in $I_R$ 202 while presenting expressive dance movements in harmony with the provided musical rhythm and beats. The pipeline 200 includes two major stages: a transformer-based 2D human dance motion generation process for generating a motion sequence, and a diffusion-based video synthesis process using the generated motion sequence. FIG. 3 shows a concept of an example reference image 300 and sampled frames generated from a music-driven dancing video generation model. As shown, the generated frames 302-308 depict diverse motions and expressive dance movements, which are synched to the provided musical beats 310. FIG. 3 illustrates the musical elements in classical musical form for ease of visualization. In practice, the music sequence $M_t$ is formatted for use by the transformer-based 2D human dance motion generation process. The music sequence $M_t$ can be implemented in various ways. FIG. 2 provides one such example.

Returning to the example pipeline 200 of FIG. 2, to generate the music embedding sequence, a pre-trained generative model for music (not shown) can be utilized to extract rich musical features. In the depicted example, the extracted features are supplemented by rhythmic information with one-hot encoding of music beats using an audio processing toolbox (not shown). The extracted embeddings can be resampled and/or synchronized to the video frame rate, ensuring per-frame alignment between the music and visual elements. In the depicted example, the embeddings representing the extracted musical features using the pre-trained generative model for music are denoted as $$F^J_{1:T},$$

and the embeddings representing the one-hot encoding of music beats using the audio processing toolbox are denoted as $$F^L_{1:T}.$$

In other implementations, the music sequence $M_t$ 204 is decoded into only one set of embeddings.

The transformer-based 2D human dance motion generation process can be implemented in various ways. In some implementations, the process is trained on a dataset of monocular, single-person, music-synchronized dance videos with paired 2D whole-body pose detections. This helps it to learn to model the intricate non-linear correlation between skeletal dance motion and musical features. To extract pose information from images, a compositional, confidence-aware VQ-VAE capable of capturing diverse and nuanced human dance poses across different body parts can be implemented. The VQ-VAE extracts pose information in the form of pose tokens describing the poses of individual body parts, which can then be utilized by a transformer model 208 to autoregressively predict future pose tokens 210, modeling temporal motion transitions within the token space and aligning them with synchronized music embeddings. Various types of transformer models can be utilized. In some implementations, a generative pre-training transformer model is utilized.

Traditional implementations of a VQ-VAE typically fail to overcome certain challenges. Given whole-body 2D poses with associated keypoint confidences p, a one-dimensional (1D) convolutional encoder can be implemented to map p into a latent pose embedding $z_e(p)=E(p)$, which can then be quantized by mapping to its nearest representation $z_q(P)$ within a learnable codebook. A decoder D 212 can reconstruct the pose $\hat{p}$ from $z_q(p)$. However, the dependencies between spatial keypoints are complex, and a traditional VQ-VAE often struggles to capture subtle pose details, such as finger movements and head tilts, due to information loss during quantization and multi-frequency nature of pose variations across different body parts.

To improve expressive coverage, independent 2D pose encoders $E^j$ 214 can be trained and B separate codebooks $$Z^j_q$$

can be learned. Any number of codebooks can be implemented for any number of different body parts. In some implementations, B=5 separate codebooks $$Z^j_q$$

are learned for upper and lower half bodies, left and right hands, and head respectively, allowing the model to spatially decompose 2D whole-body pose variations across different frequency levels. By partitioning poses, distinct body-part codes can be flexibly combined, enhancing the range of expressiveness represented within each individual codebook. To capture part-wise spatial correlations and ensure information flow across body parts, the quantized pose latents can be concatenated and fed into a shared decoder. The resulting embedding can then be mapped to reconstructed keypoint coordinates through separate projection heads, enabling joint reconstruction while preserving nuanced part-specific details.

In some implementations, the encoder 214 and decoder 212 are trained simultaneously with the compositional codebooks. Various loss functions can be utilized. One example loss function $\mathcal{L}_{VQ}$ is calculated using the following:

$$\mathcal{L}_{VQ} = \sum_{j=1}^{B} \|\hat{p}^j - p^j\|_2 + \beta \sum_{j=1}^{B} \|sg[z_e^j(p)] - z_q^j(p)\|_2 \tag{1}$$

where sg is a stop gradient operation, and the second term is a commitment loss with a trade-off β. In some implementations, exponential moving average (EMA) is utilized to update codebook vectors, and the embedding loss $$\sum_{j=1}^{B} \|z_e^j(p) - sg[z_q^j(p)]\|_2$$

can be removed for more stable training.

After training of the compositional quantized multi-part codebooks, 2D human poses detected in videos (including training videos) can be represented as sequences of codebook tokens via encoding and quantization. Specifically, each detected pose can be mapped to a sequence of corresponding codebook indices, structured as one-hot vectors indicating the nearest codebook entry for each element. In the depicted example, the sequence is denoted as $$C_{1:T}^j = ((c_{1,1}^j, \ldots, c_{K,1}^j), \ldots, (c_{1,T}^j, \ldots, c_{K,T}^j)),$$

where K is the number of tokens per body part j in each frame. Any number of frames T can be implemented. In some implementations, T=64 frames are utilized for autoregressive model training.

With a quantized motion representation, a temporal autoregressive model can be implemented to predict the multinomial distributions of possible subsequent poses for each body part, conditioned on both the input music embeddings $$F_{1:T}^J \text{ and } F_{1:T}^L$$

and the preceding motion tokens. In the depicted example, the motion generation transformer is conditioned on the music inputs in two ways. First, the music embeddings $$F_{1:T}^J \text{ and } F_{1:T}^L$$

are combined to form starting tokens, which serves as a global music context that informs the entire motion sequence generation. For example, the global music context can serve as a conditioning for styles and genres. Second, the frame-wise projected music embeddings are concatenated with the corresponding motion tokens as inputs to the transformer model, ensuring precise synchronization between the motion and music features. This dual conditioning allows the pipeline to produce both globally coherent and locally synchronized dance movements.

To handle extended motion sequence generation with consistent motion styles and smooth transitions, cross-segment motion context can also be incorporated into the transformer model. In the depicted example, a subset of the frames from the previous motion segment is sampled as the motion context. The subset of the frames can be selected and sampled in various ways. In some implementations, a predetermined number of frames is sampled uniformly. In further implementations, the subset includes eight frames. The motion context can be appended to the global music context inputs. In the depicted example, the combined context is denoted as $F_g$.

Since the body parts are modeled independently, maintaining coherence in the assembled whole-body poses allows the video generation to avoid asynchronous movements (e.g., upper and lower body moving in different directions). To address this, mutual information can be leveraged across multi-part motions. Cross-conditioning across body parts can be implemented with the model. In the depicted example, a generative pre-training transformer model is utilized to estimate the joint distributions of $$C_{1:T}^j$$

using the following formula:

$$\phi(C_{1:T}^{1:B} | F_g) = \prod_{t=1}^{T} \prod_{j=1}^{B} \prod_{k=1}^{K} \phi(c_{k,t}^j | c_{1:K,<t}^{1:B}, c_{1:K,t}^{<j}, c_{<k,t}^j, F_{\leq t}^J, F_{\leq t}^L, F_g) \tag{2}$$

The cross-conditioning between body parts can be structured in various ways. In some implementations, the current motion token is conditioned on all preceding motion information from all body parts, ensuring inter-part temporal coherence. Additionally or alternatively, body parts can be ordered with hierarchical dependencies from primary components (upper/lower body) to finer, high-frequency movements (head and hands). Since each body part's pose is represented with a small set of tokens, causal attention can be sufficient to model the next-token distribution within each part. This modeling strategy preserves motion coherence of each body part as a whole, enabling expressive and plausible dance movements.

The generative pre-training transformer model 208 can be optimized through supervised training using a cross-entropy loss on the next-token probabilities. Notably, because pose tokenization includes associated keypoint confidences, the transformer can also learn to model temporal variations in confidence, such as those caused by motion blur and occlusions, enabling it to capture more realistic motion distributions observed in videos.

With the generated motion token sequences 210 from the trained transformer model 208, a latent diffusion model 216 can be employed to synthesize high-resolution, realistic human dance videos, conditioned on the generated motions and the given reference image 202. In the depicted example, the diffusion model 216 is implemented with self-attention, cross-attention, and temporal attention mechanisms. During training, latent representations of images are progressively corrupted with Gaussian noise ϵ, following the denoising diffusion probabilistic model (DDPM) framework. A UNet-based denoising framework, enhanced with spatial and temporal attention blocks, can then be trained to learn the reverse denoising process. In the depicted example, the diffusion model 216 includes a pretrained text-to-image diffusion backbone (UNet) and incorporates additional temporal modules to improve cross-frame consistency and to ensure temporal smoothness. For transferring the reference image context, a reference network 218 can be implemented—e.g., as a trainable copy of the backbone UNet—to extract reference features such as subject appearance and background, which are cross-queried by the self-attentions within the backbone UNet of the diffusion model. Motion control can be achieved through an additional module that translates the motion conditions into 2D spatial guidance additive to the UNet features.

To incorporate the generated motion tokens into human image animation, one approach is to utilize the trained VQ-VAE decoder D 212 to decode pose tokens into keypoint coordinates, which can then be visualized as 2D skeleton maps for motion conditioning. These skeleton maps can provide motion guidance to the final diffusion synthesis through a pose guider module. While effective to some extent, this approach introduces a non-differentiable process due to the skeleton map visualization, which impedes end-to-end training and often results in the loss of keypoint confidence information. Additionally, since the temporal module is trained on real video data where pose sequences are typically smooth, it may struggle with jittery or inconsistent motions generated by the transformer model at inference.

In place of explicit translation of motion tokens into 2D skeleton maps as pose guider conditions, a trainable motion decoder 218 can be implemented. In some implementations, the trainable motion decoder 218 translates the 1D pose tokens 210 into 2D spatial guidance, which can be added towards the intermediate features of the denoising UNet. Starting from a learnable 2D feature map 220, the motion decoder can inject the 1D pose token sequences 210, including the keypoint confidences with AdaIN layers, which progressively upsamples the feature map 220 into multiple scales aligned with the resolutions of the denoising UNet features. In some implementations, the motion decoder is trained alongside the temporal module. In further implementations, the motion decoder is trained alongside the temporal module within a 16-frame sequence window, effectively decoding token sequences into continuous pose guidance that integrates temporal context from adjacent frames. By incorporating reference image context during training, the synthesized pose guidance retains minimal distinctiveness and body shape information compared to skeleton-based pose guiders, enabling generated pose tokens to adapt seamlessly to characters with varied body shapes and appearances.

Training of the music-driven dance video generation pipeline can be performed in various ways. In contrast to prior approaches that generate human motions in 3D space, diverse dance motions can be represented as 2D pose sequences. Compared to its 3D counterparts, 2D human dance motions are widely accessible from large collections of monocular videos, eliminating the need for complex multi-view capture setups or labor-intensive 3D animations. Furthermore, the detection of 2D poses is significantly more reliable and robust. To enhance the realism and motion expressiveness, both large body articulations and finer details such as head movements and hand gestures can be modeled, capturing subtle nuances in motion. Keypoint detection confidence can be incorporated into our pose representation, allowing the model to account for motion blur and occlusions. Each per frame whole-body pose with J joints is thus represented as $p \in R^{J \times 3}$, where the last dimension encodes the keypoint confidence.

In some implementations, the music-driven dance video generation pipeline is trained on a visual-audio dataset that includes monocular videos of human dance performances, which can include both indoor and outdoor settings. Datasets of various sizes and videos with various attributes, such as duration, resolution, frames per second (fps), etc., can be utilized. In some implementations, the visual-audio dataset includes over 100,000 monocular videos with an average clip duration of about thirty seconds. In further implementations, the training dataset includes videos with a predetermined resolution. Datasets with videos of different resolutions can be cropped accordingly. For example, in the depicted example, a cropping module is utilized to apply cropping to the monocular videos in the training dataset. The cropping can be performed in various ways. In some implementations, human-centric cropping is applied. For example, the videos can be cropped to encompass half-body to full-body dances. The depicted example computing system 200 further includes a resampling module to resample videos, if needed, to the same fps. In some implementations, the training dataset includes videos with a resolution of 896×512 running at 30 fps, which can include videos that have been cropped and/or resampled. The training dataset can also include videos of dances across a diverse (or specific depending on the application) range of music genres and individuals with varied (or similar) body shapes and appearances.

The pipeline can be trained in three stages. First, a multi-part pose VQ-VAE can be trained to encode and quantize N joint coordinates, with keypoint confidence scores, into M-part pose tokens. In some implementations, the VQ-VAE encodes and quantizes sixty joint coordinates into 5-part pose tokens. In further implementations, the pose of each body part uses six tokens, each with a unique 512-entry codebook of six dimensional embeddings. The VQ-VAE can be trained for a predetermined number of steps with a given batch size and a learning rate. In some implementations, VQ-VAE is trained for 40 k steps with a batch size of 2048 at a learning rate of $2 \times 10^{-4}$.

Next, an autoregressive transformer model is trained for pose token prediction. In some implementations, the autoregressive model is initialized with pre-trained generative model weights. The autoregressive model can be trained for a predetermined number of steps with a given batch size and a learning rate. In some implementations, autoregressive model is trained with 300 k steps using a batch size of twenty-four and a learning rate of $1 \times 10^{-4}$. The autoregressive model can be trained with 64-frame pose sequences with a context window of 2224 tokens in total, enabling extended dance motion generation via sliding segments during inference.

In the final stage, a diffusion model is trained. In some implementations, the diffusion model is fine-tuned with two randomly selected frames from a video, followed by co-training the motion guidance decoder and the temporal module with diffusion losses on consecutive sixteen-frames. The diffusion model can be trained for a predetermined number of steps with a given batch size and a learning rate. In some implementations, the diffusion model is trained with 90 k steps at a learning rate of $1 \times 10^{-5}$ and a batch size of sixteen.

During inference, the autoregressive dance motion generation can be initiated from pose tokens encoded from the reference image pose. This maintains skeleton consistency with the specific body shape of the subject in the reference image. Extended dance sequences can be generated in various ways. In some implementations, extended dance sequences are generated in 64-frame sliding segments with a 12-frame overlap, while eight uniformly sampled frames from previous generated motions serve as global motion context. In some implementations, all video frames are synthesized simultaneously (or concurrently) using fully generated pose token sequences. In further implementations, prompt traveling is applied to improve temporal smoothness.

For baseline comparisons, established models have been analyzed to create two baselines. First, an audio-driven, diffusion-based portrait animation model, referred to as Hallo, is adapted and retrained to the tasks described herein with regards to the music-driven dance video generation models of this disclosure. The Hallo model is retrained with its audio features substituted with the music embeddings format described above to animate human images via cross-attention modules. For the second baseline, 3D music-to-dance generation models, referred to as Bailando and EDGE, are adapted for motion synthesis. Their outputs are projected into 2D skeleton maps, which are then fed into a diffusion model with a pose guider for controlled image animation.

The music-driven dance video generation models described herein are compared to the baseline models in terms of quality of both motion generation and video synthesis. Fr´echet Video Distance (FVD) can be calculated between generated dance motions and ground-truth training sequences for assessment of motion fidelity. For motion diversity, the distributional spread of generated pose features (DIV) can be computed, wherein the generated motion should aim to match the scores of the ground truth distribution rather than maximize their absolute values. To numerically evaluate the alignment between the music and generated dancing poses, the beat align score (BAS) is measured by the average temporal distance between each music beat and its closest dancing beat. These evaluations are conducted in 2D pose space, where the 3D skeleton motion of Bailando and EDGE is projected into 2D and where poses are detected over synthesized videos from the retrained Hallo model.

FIG. 4 shows a table quantitatively comparing motion generation capabilities between various dancing video generation models for two different datasets. As shown in FIG. 4, an example of the music-driven dance (MDD) video generation model described herein surpasses all baselines in terms of motion fidelity (FVD), while achieving the second-best music beat alignment (BAS) and diversity (DIV).

The EDGE baseline model is trained on sequences from professional dancers whereas the MDD model is trained on videos of everyday individuals, reflected in the beat alignment score of the ground-truth videos. Despite this, the MDD model significantly outperforms Bailando trained on the AIST++ dataset and Hallo trained on a curated dataset for beat alignment. Hallo entangles motion generation and video synthesis, achieving a higher DIV score than the MDD model primarily due to its extremely noisy video outputs which results in jittering and chaotic skeleton motions following pose projection.

For evaluation of video synthesis fidelity, the FVD and Fréchet inception distance for video (FID-VID) scores are measured between the ground-truth and generated dance videos. Additionally, the ArcFace score is also computed, which measures the cosine similarity of face features (ID-SIM). All metrics are evaluated on an in-house curated video dataset. As an extra baseline, the motion generator in EDGE and Bailando is replaced with the trained transformer model of the MDD model described herein, and the animation is generated using a pose guider.

FIG. 5 shows a table quantitatively comparing visual synthesis capabilities between various dancing video generation models. As shown in FIG. 5, the MDD model achieves the highest visual quality and identity preservation, which can be attributed to the disentangled design of motion generation and video synthesis (compared to Hallo) and the use of an implicit motion token decoder rather than an explicit pose guider.

While the MDD model operates as a zero-shot pipeline and can be generalized seamlessly to new reference images and music inputs, it can also be fine-tuned for characterized choreography using only a few sample dance videos. This adaptability is challenging for 3D motion generation models like EDGE and Bailando, which typically require extensive effort in creating 3D dance movements.

Ablation studies can be performed by systematically removing individual design components from the full training pipeline. First, we the effectiveness of the multi-part VQ-VAE in capturing subtle and expressive human movements is assessed. Compared to a single-part whole-body VQ-VAE, the entire approach achieves a significantly lower Li reconstruction error per joint (0.5 px vs. 0.83 px), with pronounced improvements in the hands (0.4 px vs. 0.64 px) and head (0.42 px vs. 0.52 px). This improvement translates into superior motion diversity, expressiveness, and control precision in the diffusion model. Next, the impact of global music and motion context on motion generation can be assessed.

FIG. 6 shows a table of ablation studies for a music-driven dance video generation model. As presented in FIG. 6, both contexts contribute to producing more consistent, plausible, and music-synchronized motions. The benefits of 2D motion modeling and transformer-based autoregressive generation by scaling both model parameters and dataset size are then analyzed. Across all metrics, significant performance gains were observed as the number of training parameters increases from 117M (GPT-small) to 345M (GPT-medium) and data scale from 10 k to 100 k videos, underscoring the scalability potential of monocular dance video data with our architecture, shedding light on further performance improvements as they scale.

Figure 7:
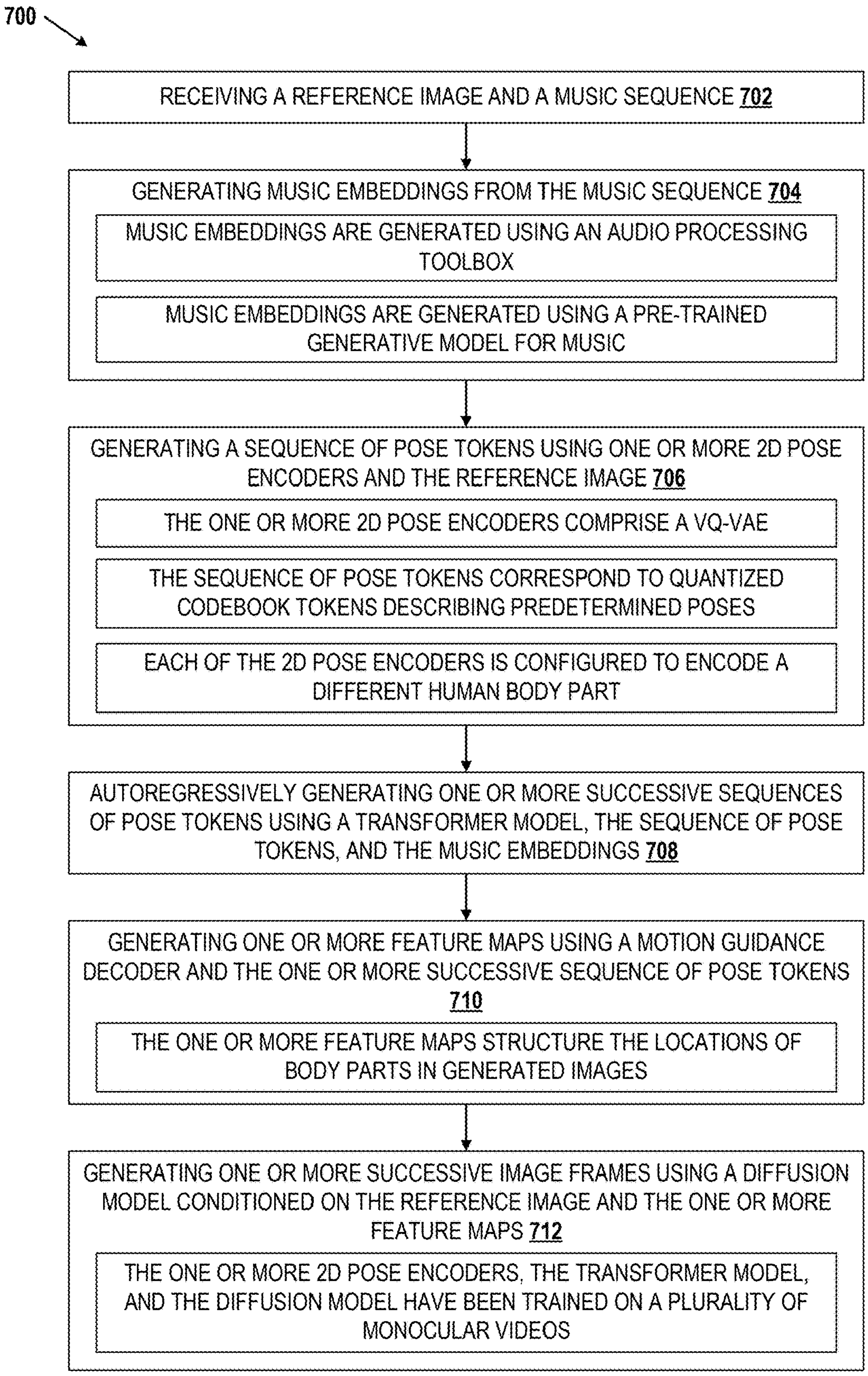
FIG. 7 shows a process flow diagram of an example method for implementing a music-driven dance video generation pipeline, which can be implemented using the example computing system of FIG. 1.

FIG. 7 shows a process flow diagram of an example method 700 for implementing a music-driven dance video generation pipeline. At step 702, the method 700 includes receiving a reference image and a music sequence. At step 704, the method 700 includes generating music embeddings from the music sequence. The music embeddings can be generated in various ways. In some implementations, the music embeddings are generated using an audio processing toolbox. Additionally or alternatively, the music embeddings are generated using a pre-trained generative model for music. For example, the music embeddings can include two sets of embeddings, each set generated using a different way. Different sources for generating the music embeddings can provide different conditioning. One source may provide conditioning on the music rhythm and beat while another source may provide conditioning on musical style/genre.

At step 706, the method 700 includes generating a sequence of pose tokens using one or more 2D pose encoders and the reference image. The 2D pose encoders can be implemented in various ways. For example, the 2D pose encoders can be implemented using one or more VQ-VAEs.

In some implementations, the 2D pose encoders are configured to encode human body parts, each 2D pose encoder configured to encode a different human body part. Alternatively, the sequence of pose tokens can be generated using a 2D pose encoder configured to encode the entire human body. The sequence of pose tokens can be implemented in various ways. In some implementations, the sequence of pose tokens are quantized tokens. For example, the one or more 2D pose encoders can generate latent pose embeddings based on the reference image. The latent pose embeddings can then be quantized by mapping each embedding to its nearest representation within a learnable codebook. The learnable codebooks are directories with a finite number of entries, each entry corresponding to a predetermined pose. Different codebooks can be configured for different body parts.

At step 708, the method 700 includes autoregressively generating one or more successive sequences of pose tokens using a transformer model. The successive sequences of pose tokens can be generated in various ways. Each sequence can correspond to a pose of the human (multiple pose tokens within a sequence can encode poses for multiple body parts) for a given time point. In some implementations, cross-conditioning is implemented to generate pose tokens of body parts that are consistent with each other (e.g., preventing an upper body and a lower body from going opposite directions). The successive sequence of pose tokens can be generated conditioned on the music embeddings. In some implementations, a successive sequence of pose tokens is generated conditioned on a respective music embedding corresponding to the time stamp of the current sequence. This enables the transformer model to generate successive pose tokens that can animate dancing in accordance with the music sequence (e.g., dancing choreographed to the beat of the music sequence). Additionally or alternatively, the successive sequence can be generated conditioned on the entirety of the music embeddings.

Using the entirety of the music embeddings provides overall context for the generative process (e.g., conditioning the generative process to generate dancing corresponding to a musical genre/style). Other type of context may also be used. Generally, the transformer model is configured to predict a next successive token based on preceding tokens. For temporal consistency, the successive sequence of pose tokens can be predicted based on multiple preceding tokens. In some implementations, the successive sequence of pose tokens is generated conditioned on all previous pose tokens. In other implementations, the successive sequence of pose tokens is generated conditioned on a predetermined number of previous pose tokens that are uniformly sampled.

At step 710, the method 700 includes generating one or more feature maps using a motion guidance decoder and the one or more successive sequence of pose tokens. The feature maps can be implemented in various ways. Generally, a feature map is generated for each sequence of pose tokens. The sequence of pose tokens can be decoded to determine the 2D location of the various tracked body parts. The feature map can be implemented as a 2D feature map that reflects the location of the body parts for a given time point.

At step 712, the method 700 includes generating one or more successive image frames using a diffusion model. As described above, the image frames can be generated conditioned on a feature map. For example, for a given time point, the corresponding feature map can be used to provide structure to the image to be generated, dictating the locations of the various body parts. In some implementations, the image frames are generated conditioned on the reference image. This provides visual consistency across the frames (e.g., to prevent the person dancing from changing to a different person).

The present disclosure provides for implementations of a novel framework for generating music-driven dance videos. The framework excels at generating diverse, expressive, and detailed whole-body dance video animations attuned to input music, adaptable to both realistic and stylized human images across various body types. The framework unites an autoregressive transformer with a diffusion model to generate high-quality, music-driven human dance videos from a single reference image, achieving state-of-the-art performance in terms of motion diversity, expressiveness, music alignment and video quality.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
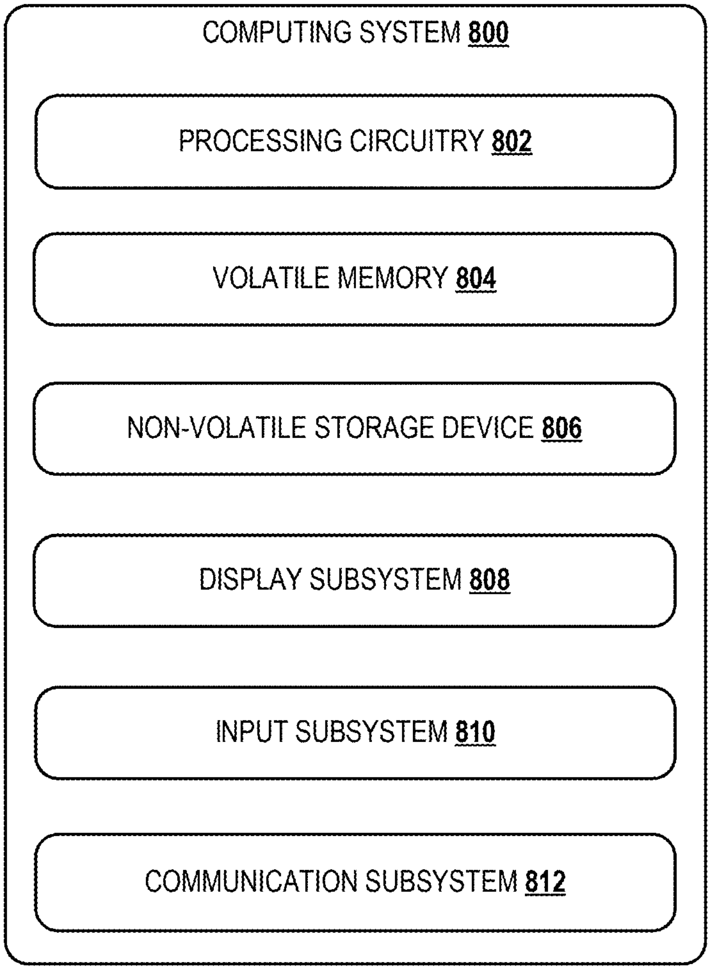
FIG. 8 shows a schematic view of an example computing system that can enact one or more of the methods and processes described herein.

FIG. 8 schematically shows a non-limiting embodiment of a computing system 800 that can enact one or more of the methods and processes described above. Computing system 800 is shown in simplified form. Computing system 800 may embody the computing system 100 described above and illustrated in FIG. 8. Components of computing system 800 may be included in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 800 includes processing circuitry 802, volatile memory 804, and a non-volatile storage device 806. Computing system 800 may optionally include a display subsystem 808, input subsystem 810, communication subsystem 812, and/or other components not shown in FIG. 8.

Processing circuitry 802 includes a logic processor that can be implemented with one or more physical devices configured to execute instructions. For example, the processing circuitry 802 may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The processing circuitry 802 may include one or more physical processors configured to execute software instructions. Additionally or alternatively, the processing circuitry 802 may include one or more hardware logic circuits or firmware devices configured to execute hardware-implemented logic or firmware instructions. Processors of the processing circuitry 802 may be single-core or multi-core, and the instructions executed thereon may be configured for sequential, parallel, and/or distributed processing. Individual components of the processing circuitry 802 optionally may be distributed among two or more separate devices, which may be remotely located and/or configured for coordinated processing. Aspects of the processing circuitry 802 may be virtualized and executed by remotely accessible, networked computing devices configured in a cloud-computing configuration. In such a case, these virtualized aspects are run on different physical logic processors of various different machines, it will be understood.

Non-volatile storage device 806 may include physical devices that are removable and/or built in. Non-volatile storage device 806 may include optical memory, semiconductor memory, and/or magnetic memory, or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by processing circuitry 802 to temporarily store information during processing of software instructions. It will be appreciated that volatile memory 804 typically does not continue to store instructions when power is cut to the volatile memory 804.

Aspects of processing circuitry 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 typically implemented in software by a processor to perform a particular function using portions of volatile memory, which function involves transformative processing that specially configures the processor to perform the function. Thus, a module, program, or engine may be instantiated via processing circuitry 802 executing instructions held by non-volatile storage device 806, using portions of volatile memory 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 808 may be used to present a visual representation of data held by non-volatile storage device 806. The visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with processing circuitry 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, camera, or microphone.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 800 to send and/or receive messages to and/or from other devices via a network such as the Internet.

The following paragraphs provide additional description of the subject matter of the present disclosure. One example provides a computing system for music-driven dance video generation, the computing system comprising: processing circuitry and memory storing instructions that, during execution, causes the processing circuitry to: receive a reference image and a music sequence; generate music embeddings using the music sequence; generate a sequence of pose tokens using one or more two-dimensional (2D) pose encoders and the reference image; autoregressively generate one or more successive sequences of pose tokens using a transformer model, the sequence of pose tokens, and the music embeddings; generate one or more feature maps using a motion guidance decoder and the one or more successive sequence of pose tokens; and generate one or more successive image frames using a diffusion model conditioned on the reference image and the one or more feature maps. In this example, additionally or alternatively, the one or more 2D pose encoders, the transformer model, and the diffusion model have been trained on a dataset comprising a plurality of monocular videos. In this example, additionally or alternatively, the music embeddings are generated further using one or more of an audio processing toolbox and a pre-trained generative model for music. In this example, additionally or alternatively, the sequence of pose tokens comprises a sequence of codebook tokens that correspond to codebook entries describing predetermined poses. In this example, additionally or alternatively, the one or more 2D pose encoders comprises a plurality of 2D pose encoders, each of the plurality of 2D pose encoders configured to encode a different human body part. In this example, additionally or alternatively, the one or more successive sequences of pose tokens are autoregressively generated with cross-conditioning across the different human body parts associated with the plurality of 2D pose encoders. In this example, additionally or alternatively, each of the one or more successive sequences of pose tokens is autoregressively generated conditioned on a respective aligned music embedding of the music embeddings and a respective previous sequence of pose tokens. In this example, additionally or alternatively, each of the one or more successive sequences of pose tokens is autoregressively generated further conditioned on motion context, wherein the motion context comprises a predetermined number of past sequences of pose tokens. In this example, additionally or alternatively, the one or more successive image frames are generated using the diffusion model with self-attention, cross-attention, and temporal attention mechanisms. In this example, additionally or alternatively, the one or more 2D pose encoders comprises a vector quantized variational autoencoder.

Another example provides a method for music-driven dance video generation, the method comprising: receiving a reference image and a music sequence; generating music embeddings using the music sequence; generating a sequence of pose tokens using one or more two-dimensional (2D) pose encoders and the reference image; autoregressively generating one or more successive sequences of pose tokens using a transformer model, the sequence of pose tokens, and the music embeddings; generating one or more feature maps using a motion guidance decoder and the one or more successive sequence of pose tokens; and generating one or more successive image frames using a diffusion model conditioned on the reference image and the one or more feature maps. In this example, additionally or alternatively, the one or more 2D pose encoders, the transformer model, and the diffusion model have been trained on a dataset comprising a plurality of monocular videos. In this example, additionally or alternatively, the music embeddings are generated further using one or more of an audio processing toolbox and a pre-trained generative model for music. In this example, additionally or alternatively, the sequence of pose tokens comprises a sequence of codebook tokens that correspond to codebook entries describing predetermined poses. In this example, additionally or alternatively, the one or more 2D pose encoders comprises a plurality of 2D pose encoders, each of the plurality of 2D pose encoders configured to encode a different human body part. In this example, additionally or alternatively, the one or more successive sequences of pose tokens are autoregressively generated with cross-conditioning across the different human body parts associated with the plurality of 2D pose encoders. In this example, additionally or alternatively, each of the one or more successive sequences of pose tokens is autoregressively generated conditioned on a respective aligned music embedding of the music embeddings and a respective previous sequence of pose tokens. In this example, additionally or alternatively, each of the one or more successive sequences of pose tokens is autoregressively generated further conditioned on motion context, wherein the motion context comprises a predetermined number of past sequences of pose tokens. In this example, additionally or alternatively, the one or more successive image frames are generated using the diffusion model with self-attention, cross-attention, and temporal attention mechanisms.

Another example provides a method for training a framework for music-driven dance video generation, the method comprising: receiving a training dataset comprising a plurality of monocular videos; training a plurality of two-dimensional (2D) pose encoders using the training dataset, wherein each of the plurality of 2D pose encoders is trained to encode a different human body part; training a transformer model to autoregressively perform next token prediction using sequences of pose tokens generated by the trained plurality of 2D pose encoders and the training dataset; and training a diffusion model to generate images using the training dataset.

"And/or" as used herein is defined as the inclusive or V, as specified by the following truth table:

| A | B | A ∨ B |
|---|---|---|
| True | True | True |
| True | False | True |
| False | True | True |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for music-driven dance video generation, the computing system comprising:
- processing circuitry and memory storing instructions that, during execution, causes the processing circuitry to:
  - receive a reference image and a music sequence;
  - generate music embeddings using the music sequence;
  - generate a sequence of pose tokens using one or more two-dimensional (2D) pose encoders and the reference image;
  - autoregressively generate one or more successive sequences of pose tokens using a transformer model, the sequence of pose tokens, and the music embeddings;
  - generate one or more feature maps using a motion guidance decoder and the one or more successive sequence of pose tokens; and
  - generate one or more successive image frames using a diffusion model conditioned on the reference image and the one or more feature maps.

2. The computing system of claim 1, wherein the one or more 2D pose encoders, the transformer model, and the diffusion model have been trained on a dataset comprising a plurality of monocular videos.

3. The computing system of claim 1, wherein the music embeddings are generated further using one or more of an audio processing toolbox and a pre-trained generative model for music.

4. The computing system of claim 1, wherein the sequence of pose tokens comprises a sequence of codebook tokens that correspond to codebook entries describing predetermined poses.

5. The computing system of claim 1, wherein the one or more 2D pose encoders comprises a plurality of 2D pose encoders, each of the plurality of 2D pose encoders configured to encode a different human body part.

6. The computing system of claim 5, wherein the one or more successive sequences of pose tokens are autoregressively generated with cross-conditioning across the different human body parts associated with the plurality of 2D pose encoders.

7. The computing system of claim 1, wherein each of the one or more successive sequences of pose tokens is autoregressively generated conditioned on a respective aligned music embedding of the music embeddings and a respective previous sequence of pose tokens.

8. The computing system of claim 1, wherein each of the one or more successive sequences of pose tokens is autoregressively generated further conditioned on motion context, wherein the motion context comprises a predetermined number of past sequences of pose tokens.

9. The computing system of claim 1, wherein the one or more successive image frames are generated using the diffusion model with self-attention, cross-attention, and temporal attention mechanisms.

10. The computing system of claim 1, wherein the one or more 2D pose encoders comprises a vector quantized variational autoencoder.

11. A method for music-driven dance video generation, the method comprising:

receiving a reference image and a music sequence;

generating music embeddings using the music sequence;

generating a sequence of pose tokens using one or more two-dimensional (2D) pose encoders and the reference image;

autoregressively generating one or more successive sequences of pose tokens using a transformer model, the sequence of pose tokens, and the music embeddings;

generating one or more feature maps using a motion guidance decoder and the one or more successive sequence of pose tokens; and generating one or more successive image frames using a diffusion model conditioned on the reference image and the one or more feature maps.

12. The method of claim 11, wherein the one or more 2D pose encoders, the transformer model, and the diffusion model have been trained on a dataset comprising a plurality of monocular videos.

13. The method of claim 11, wherein the music embeddings are generated further using one or more of an audio processing toolbox and a pre-trained generative model for music.

14. The method of claim 11, wherein the sequence of pose tokens comprises a sequence of codebook tokens that correspond to codebook entries describing predetermined poses.

15. The method of claim 11, wherein the one or more 2D pose encoders comprises a plurality of 2D pose encoders, each of the plurality of 2D pose encoders configured to encode a different human body part.

16. The method of claim 15, wherein the one or more successive sequences of pose tokens are autoregressively generated with cross-conditioning across the different human body parts associated with the plurality of 2D pose encoders.

17. The method of claim 11, wherein each of the one or more successive sequences of pose tokens is autoregressively generated conditioned on a respective aligned music embedding of the music embeddings and a respective previous sequence of pose tokens.

18. The method of claim 11, wherein each of the one or more successive sequences of pose tokens is autoregressively generated further conditioned on motion context, wherein the motion context comprises a predetermined number of past sequences of pose tokens.

19. The method of claim 11, wherein the one or more successive image frames are generated using the diffusion model with self-attention, cross-attention, and temporal attention mechanisms.

20. A method for training a framework for music-driven dance video generation, the method comprising:

receiving a training dataset comprising a plurality of monocular videos;

training a plurality of two-dimensional (2D) pose encoders using the training dataset, wherein each of the plurality of 2D pose encoders is trained to encode a different human body part;

training a transformer model to autoregressively perform next token prediction using sequences of pose tokens generated by the trained plurality of 2D pose encoders and the training dataset; and training a diffusion model to generate images using the training dataset.

* * * * *